US010095222B2

United States Patent
Morita et al.

(10) Patent No.: US 10,095,222 B2
(45) Date of Patent: Oct. 9, 2018

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Yuuki Morita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 15/411,875

(22) Filed: Jan. 20, 2017

(65) Prior Publication Data

US 2017/0212502 A1 Jul. 27, 2017

(30) Foreign Application Priority Data

Jan. 26, 2016 (JP) ................................ 2016-012218

(51) Int. Cl.
*G05B 19/416* (2006.01)
*G05B 19/414* (2006.01)

(52) U.S. Cl.
CPC ......... *G05B 19/416* (2013.01); *G05B 19/414* (2013.01); *G05B 2219/49108* (2013.01)

(58) Field of Classification Search
CPC ............... G05B 19/416; G05B 19/414; G05B 2219/49108
USPC ........................................................ 700/159
See application file for complete search history.

(56) References Cited

U.S. PATENT DOCUMENTS

| 5,132,912 A | * | 7/1992 | Ito | G05B 19/186 |
| | | | | 318/571 |
| 6,008,609 A | * | 12/1999 | Sawashima | G05B 19/186 |
| | | | | 318/569 |
| 2015/0081084 A1 | * | 3/2015 | Nishiwaki | G05B 19/416 |
| | | | | 700/170 |

FOREIGN PATENT DOCUMENTS

| JP | 2629729 B2 | 7/1997 |
| JP | 2003-181722 A | 7/2003 |
| JP | 2004-141991 A | 5/2004 |
| JP | 3553741 B2 | 8/2004 |

(Continued)

*Primary Examiner* — Kenneth M Lo
*Assistant Examiner* — Sivalingam Sivanesan
(74) *Attorney, Agent, or Firm* — Hauptman Ham, LLP (57) ABSTRACT

A controller for controlling a synchronized operation of spindle and feed axes. A spindle-axis control section includes an initial-motion control section for accelerating a spindle axis at maximum capacity from a starting position; a maximum-acceleration detecting section for detecting a maximum acceleration of the spindle axis; a residual rotation-amount detecting section for detecting a residual rotation amount of the spindle axis; a current-speed detecting section for detecting a current speed of the spindle axis; a decelerating-motion control section for decelerating the spindle axis to reach an intermediate speed, after the acceleration; a positioning-motion control section for decelerating the spindle axis to reach the target position after reaching the intermediate speed; a flux-content predicting section for predicting an actual motor-flux content at the intermediate speed; and a deceleration determining section for determining a deceleration for a positioning operation, based on the maximum acceleration, the motor-flux-content command value and the motor-flux content.

8 Claims, 4 Drawing Sheets

(56) References Cited

FOREIGN PATENT DOCUMENTS

JP  2013-186545 A  9/2013

\* cited by examiner

DEVICE AND METHOD OF CONTROLLING MACHINE TOOL, TO CONTROL SYNCHRONIZED OPERATION OF SPINDLE AXIS AND FEED AXIS

RELATED APPLICATION

The present application claims priority to Japanese Patent Application No. 2016-012218 filed Jan. 26, 2016, the disclosure of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to reduce cycle time by controlling the spindle axis so as to maximize the acceleration capacity thereof with a simple configuration, without performing a preliminary work requiring a high-level skill, such as a parameter setting or adjustment, etc., required for a numerical control unit to prepare acceleration and deceleration commands in conformity with the power characteristics of the spindle axis. Further, it is desirable to make the spindle axis accurately reach a target position.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section. The spindle-axis control section comprises an initial-motion control section configured to make the spindle axis perform an accelerated rotation at maximum capacity from the starting position, by a velocity control in which the maximum rotation speed is set as a target value; a maximum-acceleration detecting section configured to detect a maximum acceleration of the spindle axis during the accelerated rotation at maximum capacity, based on the rotational position; a residual rotation-amount detecting section configured to detect a residual rotation amount of the spindle axis during a period when the spindle axis operates from a current position to the target position, based on the total rotation amount and the rotational position; a current-speed detecting section configured to detect a current speed of the spindle axis based on the rotational position; a decelerating-motion control section configured to execute a velocity control for making the spindle axis perform a decelerated rotation at maximum capacity so as to reach a predetermined intermediate speed, after the accelerated rotation at maximum capacity; a positioning-motion control section configured to execute a position control for making the spindle axis perform a decelerated rotation so as to reach the target position, after the spindle axis reaches the intermediate speed; a flux-content predicting section configured to predict an actual motor-flux content at the intermediate speed, based on a motor-flux-content command value for making the spindle axis reach the intermediate speed; and a deceleration determining section configured to determine a deceleration during the decelerated rotation by the position control, based on the maximum acceleration, the motor-flux-content command value and the motor-flux content; the positioning-motion control section configured to execute the position control, based on the residual rotation amount, the current speed and the deceleration.

Another aspect of the invention provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a starting position to a target position; making the spindle axis perform an accelerated rotation at maximum capacity from the starting position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target position, based on the total rotation amount and the rotational position feedback; detecting a current speed of the spindle axis based on the rotational position feedback; executing a velocity control for making the spindle axis perform a decelerated rotation at maximum capacity so as to reach a predetermined intermediate speed, after the accelerated rotation at maximum capacity; executing a position control for making the spindle axis perform a decelerated rotation so as to reach the target position, after the spindle axis reaches the intermediate speed; predicting an actual motor-flux content at the intermediate speed, based on a motor-flux-content command value for making the spindle axis reach the intermediate speed; and determining a deceleration during the decelerated rotation by the position control, based on the maximum acceleration, the motor-flux-content command value and the motor-flux content; the step of making the spindle axis reach the target position including the step of executing the position control, based on the residual rotation amount, the current speed and the deceleration.

The controller according to one aspect has a configuration wherein, when the spindle axis is made to perform the rotational motion from the starting position to the target position, the numerical control section instructs only the total rotation amount and the maximum rotation speed, of the spindle axis, as the spindle axis command to the spindle-axis control section, and the spindle-axis control section performs, in accordance with the spindle axis command, the rotational motion by accelerating the spindle axis with the maximum power using the maximum permissible current, aiming at the maximum rotation speed, and continuously performs, based on the sequentially detected residual rotation amount and current speed of the spindle axis, the rotational motion until the target position while decelerating the spindle axis at the maximum or appropriate deceleration so as to make the spindle axis reach the target position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration as to predict the actual motor-flux content at the intermediate speed in the step of making the spindle axis reach the intermediate speed through the decelerated rotation from the maximum speed, and determines the deceleration during the period when the spindle axis is made by the position control perform the decelerated rotation from the intermediate speed until the target position, with use of the predicted motor-flux content. Therefore, even if the actual motor-flux content of the spindle motor, at the instant when the spindle axis reaches the intermediate speed from the maximum speed, is equal to or less than the motor-flux-content command value, the spindle axis is able to perform the decelerated rotation at the appropriate deceleration from the intermediate speed, and accurately reach the target thread depth.

In the control method according to the other aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Embodiments of the present invention will be described below with reference to the accompanying drawings. Throughout the drawings, corresponding components are denoted by common reference numerals.

Figure 1:
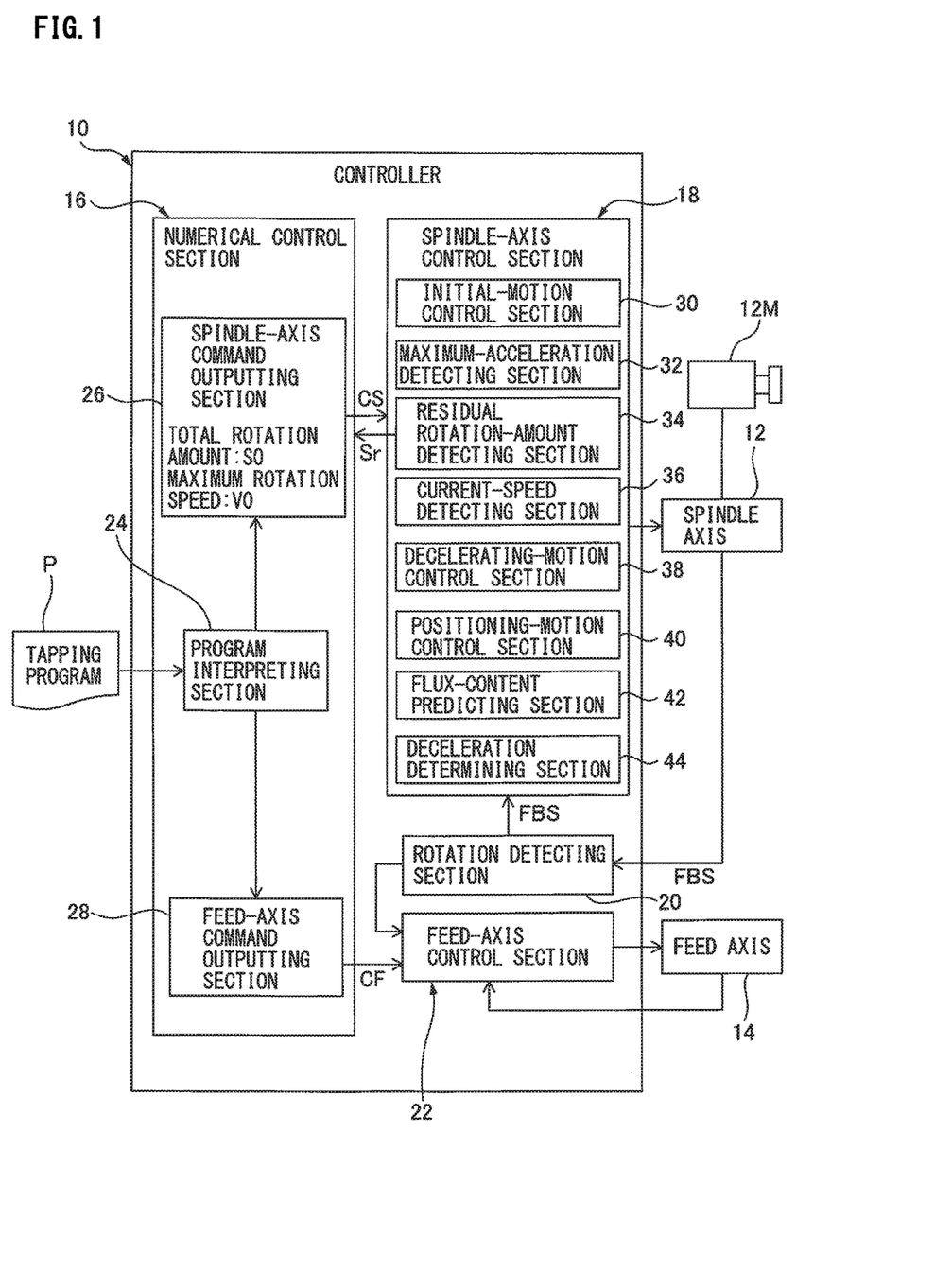
FIG. 1 is a functional block diagram showing a configuration of one embodiment of a machine tool controller.

FIG. 1 is a functional block diagram showing a configuration of a device 10 of controlling (i.e., a controller 10 of) a machine tool, according to one embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. The spindle axis 12 is a control axis provided for a spindle motor 12M that rotates a hold unit for holding a workpiece or a tool at a necessary speed for processing. The feed axis 14 is a control axis provided for a servo motor (not shown) that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that in the present invention the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a starting position (a rotational position) to a target position (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from a process start position as the starting position to a target thread depth as the target position, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command and/or an acceleration/deceleration command, which makes the spindle axis 12 perform a rotational motion until the target position (or target thread depth).

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not shown), such as an encoder, etc., for detecting the operating position of the spindle motor 12M.

The spindle-axis control section 18 includes an initial-motion control section 30 configured to make the spindle axis 12 perform an accelerated rotation at maximum capacity from the starting position, by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., rev/min$^2$) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target position, based on the total rotation amount S0, sent from the spindle-axis command outputting section 26, and the rotational position FBS; a current-speed detecting section 36 configured to detect a current speed Vc of the spindle axis 12 based on the rotational position FBS; a decelerating-motion control section 38 configured to execute a velocity control for making the spindle axis 12 perform a decelerated rotation at maximum capacity so as to reach a predetermined intermediate speed Vb, after the accelerated rotation at maximum capacity; a positioning-motion control section 40 configured to execute a position control for making the spindle axis 12 perform a decelerated rotation so as to reach the target position, after the spindle axis 12 reaches the intermediate speed Vb; a flux-content predicting section 42 configured to predict an actual motor-flux content Φvb at the intermediate speed Vb, based on a motor-flux-content command value Φmax for making the spindle axis 12 reach the intermediate speed Vb; and a deceleration determining section 44 configured to determine a deceleration (i.e., a negative acceleration) Adec during the decelerated rotation by the position control, based on the maximum acceleration A0, the motor-flux-content command value Φmax and the motor-flux content Φvb. The positioning-motion control section 40 is configured to execute the position control, based on the residual rotation amount Sr, the current speed Vc and the deceleration Adec, so as to make the spindle axis 12 stop at the target position.

The intermediate speed Vb is previously determined for the spindle axis 12 as a rotational speed (i.e., a base speed of the spindle motor 12M) by which an acceleration with a constant torque (i.e., a constant acceleration) can be performed from the start of operation to the speed Vb, and may be stored as one of control parameters in a memory (not shown) of the controller 10. Therefore, in the controller 10, it is premised that the maximum rotation speed V0 described in the tapping program P is higher than the intermediate speed Vb which is the base speed of the spindle motor 12M. In a case where a spindle motor is designed as an induction motor, a voltage for operating the spindle motor becomes insufficient in a speed range exceeding a base speed. Therefore, in order to make the spindle motor rotate at a speed higher than the base speed, a control strategy (known as a field weakening control), which gradually decreases a flux content of the spindle motor from a maximum value at the base speed in a manner as inversely proportional to the increase of the speed, has been conventionally executed, and thereby the voltage is made uniform and a commanded speed is achieved. Analogously, in the controller 10, the initial-motion control section 30 is configured to execute the field weakening control in the speed range exceeding the base speed, during a period when the spindle axis 12 performs the accelerated rotation from the start of operation to the maximum rotation speed V0 set as the target value.

In the controller 10, the spindle axis 12 makes a transition from the accelerated rotation to the decelerated rotation at an instant when the spindle axis reaches the maximum rotation speed V0 or a position where the residual rotation amount Sr is equal to one-half of the total rotation amount S0. When the spindle axis 12 decelerates from a maximum speed of the accelerated rotation, the decelerating-motion control section 38 executes a control strategy which gradually increases a flux content of the spindle motor 12M to a target or maximum value at the intermediate speed (i.e., the base speed) Vb, in a speed range between the maximum speed and the intermediate speed Vb, in a manner as inversely proportional to the decrease of the speed. In this connection, the flux content of the spindle (or induction) motor 12M is proportional to the product of an excitation current Id and a mutual inductance M, and the actually generated flux content exhibits first-order-lag response characteristics having time constant "τ" (sec). The actual flux content Φ(t) after time "t" (sec) elapsed from the start of operation of the spindle motor 12M, with a constant excitation current Id kept flowing from the start of operation (excitation current Id=0; flux content Φ=0), may be represented by the following equation 1 using the time constant τ (sec):

$$\tau(t)=M \times Id \times (1-\exp(-t/\tau)) \quad \text{(equation 1)}$$

During a period when the decelerating-motion control section 38 executes the control strategy for gradually increasing the flux content of the spindle motor 12M, the actual flux content increases in association with the aforementioned first-order-lag response characteristics. Note that the time constant τ is previously set for the spindle axis 12 as a characteristic value of the spindle motor 12M, and may be stored as one of control parameters in a memory (not shown) of the controller 10.

The controller 10 may have a configuration wherein the spindle motor 12 performs the decelerated rotation at maximum deceleration corresponding to the maximum acceleration A0 detected by the maximum-acceleration detecting section 32, in terms of decreased cycle time, during a period when the positioning-motion control section 40 makes the spindle axis 12 perform the decelerated rotation from the intermediate speed Vb so as to reach the target position. In this configuration, it is only required for the positioning-motion control section 40 to monitor the residual rotation amount Sr and the current speed Vc, which are sequentially detected by the residual rotation-amount detecting section 34 and the current-speed detecting section 36, respectively, and calculate a position at which it is expected that "Sr" becomes equal to zero (i.e., the spindle axis reaches the target position) if the spindle axis 12 is decelerated from the current speed Vc (=Vb) at the maximum deceleration, and start the position control at an instant when the spindle axis reaches the calculated position. However, the actual flux content of the spindle motor 12M, at the instant when the spindle axis 12 reaches the intermediate speed Vb through the deceleration from the maximum speed, tends to become lower than the flux content (i.e., maximum value) at the instant when the initial-motion control section 30 makes the spindle axis 12 reach the intermediate speed Vb by the maximum acceleration A0, due to the aforementioned first-order-lag response characteristics. If the decelerated rotation of the spindle axis 12 at the maximum deceleration corresponding to the maximum acceleration A0 is started in a condition where the actual flux content of the spindle motor 12M does not reach the maximum value, the spindle axis 12 may not actually generate the maximum deceleration, and thus may temporarily overshoot the target position as a result of the fact that the position control is started while assuming the decelerated rotation at the maximum deceleration.

Therefore, the controller 10 takes into consideration the aforementioned first-order-lag response characteristics of the flux content of the spindle motor 12M, and has a configuration wherein the flux-content predicting section 42 predicts the actual motor-flux content Φvb (Φvb≤Φmax) at the intermediate speed Vb, based on the motor-flux-content command value Φmax (i.e., the maximum value of the flux content) at the intermediate speed Vb, which is obtained from a velocity command, in the processing of the decelerating-motion control section 38 for making the spindle axis 12 reach the intermediate speed Vb through the decelerated rotation from the maximum speed. After the spindle axis 12 has reached the intermediate speed Vb, the positioning-motion control section 40 uses the deceleration Adec determined by the deceleration determining section 44 based on the predicted motor-flux content Φvb, so as to calculate a position at which it is expected that the residual rotation amount Sr becomes equal to zero (i.e., the spindle axis reaches the target position) if the spindle axis 12 is decelerated from the current speed Vc (=Vb) at the deceleration Adec, and starts the position control at an instant when the spindle axis reaches the calculated position. According to this configuration, even if the actual motor-flux content Φvb of the spindle motor 12M, at the instant when the spindle axis 12 reaches the intermediate speed Vb through the deceleration from the maximum speed, is equal to or less than the motor-flux-content command value Φmax, the spindle axis 12 is able to perform the decelerated rotation at the appropriate deceleration Adec from the intermediate speed Vb, and accurately reach the target position. The strategies for predicting the motor-flux content Φvb and for determining the deceleration Adec will be described later in further detail.

The controller 10 is capable of controlling, in a tapping process using a machine tool, a rotational motion of the spindle axis 12 for cutting a pilot hole of a workpiece with a tool until a target thread depth (referred to as a cutting motion, in this application). Also, the controller 10 is capable of controlling, in a tapping process using a machine tool, a rotational motion of the spindle axis 12 for pulling out a tool from a workpiece after cutting a pilot hole of the workpiece until a target thread depth (referred to as a return motion, in this application). In the control of the cutting motion, the "starting position" corresponds to a "process start position" of the tapping process, and the "target position" corresponds to a "target thread depth" of the tapping process. In the control of the return motion, the "starting position" corresponds to a "target thread depth" of the tapping process, and the "target position" corresponds to a "return completion position" of the tapping process.

Figure 2:
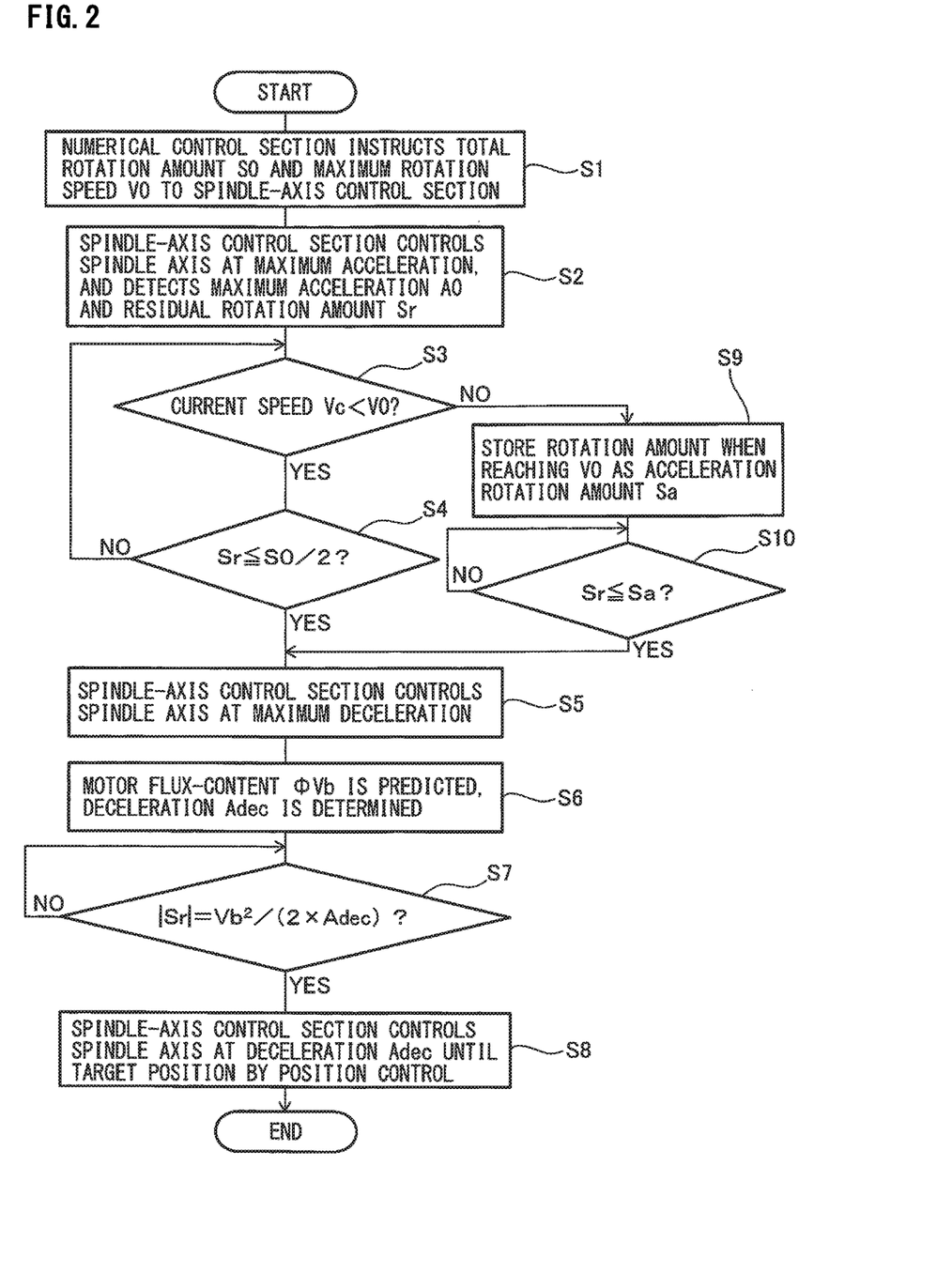
FIG. 2 is a flowchart showing a configuration of one embodiment of a machine tool controller.
Figure 3:
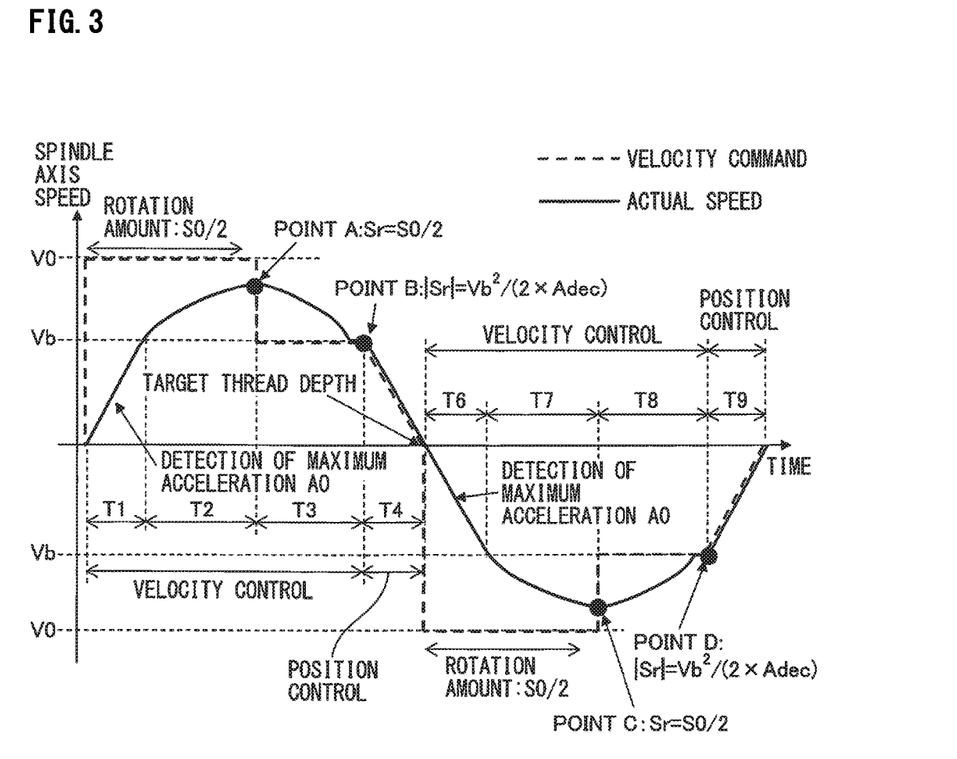
FIG. 3 is a diagram showing one example of the motion of a spindle axis in the embodiment of FIG. 2.
Figure 4:
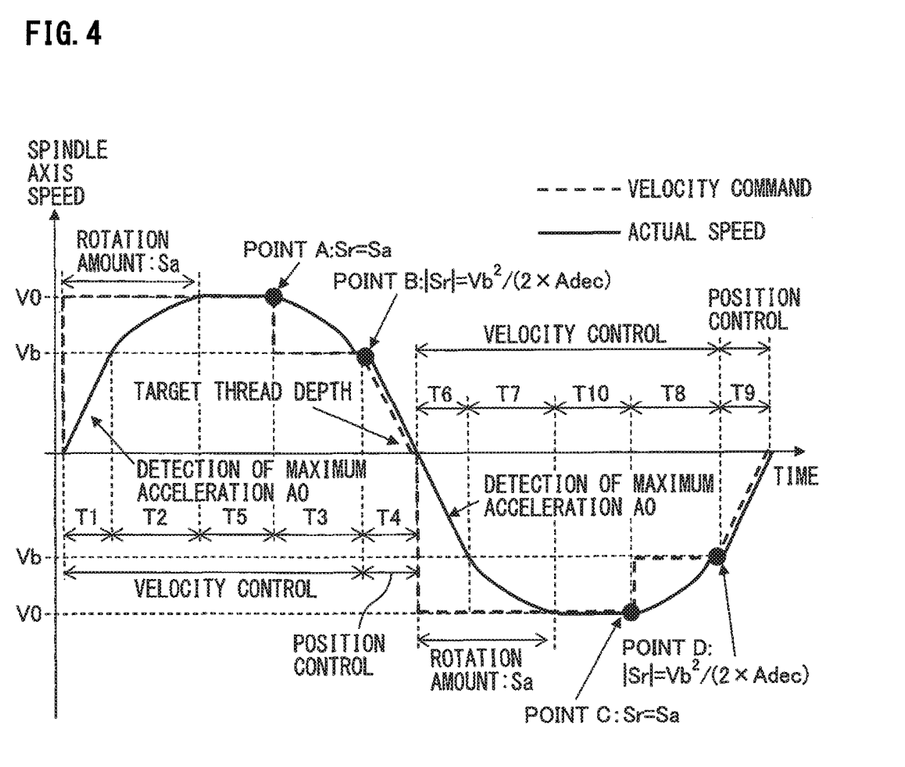
FIG. 4 is a diagram showing another example of the motion of the spindle axis in the embodiment of FIG. 2.

FIG. 2 shows one embodiment of a method of controlling a machine tool, executed by the controller 10. FIGS. 3 and 4 show two different examples of motions of the spindle axis 12, achieved by the control method of FIG. 2. The control method according to the illustrated embodiment may control both of the cutting motion and return motion of the spindle axis 12 in the tapping process. For better understanding, the following description uses the terms "total rotation amount", "maximum rotation speed", "accelerated rotation", "residual rotation amount", "current speed", "decelerated rotation", "intermediate speed" and "deceleration" in relation to the control of the cutting motion, while uses respectively corresponding, substantially synonymous terms "total return-rotation amount", "maximum return-rotation speed", "accelerated inverse rotation", "residual return-rotation amount", "current speed of inverse rotation", "decelerated inverse rotation", "intermediate return-speed" and "deceleration of inverse rotation" in relation to the control of the return motion.

First, a method of controlling the cutting motion of the spindle axis 12, executed by the controller 10, will be described below with reference to a flow chart illustrated in FIG. 2 as well as FIG. 1. At step S1, the numerical control section 16 (the spindle-axis command outputting section 26) obtains, from a command value provided in the tapping program P interpreted by the program interpreting section 24, the total rotation amount S0 and the maximum rotation speed V0, of the spindle axis 12, during a period when the spindle axis operates from the process start position (or starting position) to the target thread depth (or target position), and instructs the total rotation amount S0 and the maximum rotation speed V0 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source to perform the cutting motion from the process start position (i.e., zero speed), by a velocity control in which the maximum rotation speed V0 is set as a target speed, detects the maximum acceleration A0 during the accelerated rotation at maximum capacity, and sequentially detects the residual rotation amount Sr from the current position during the accelerated rotation. The spindle-axis control section 18 notifies the detected residual rotation amount Sr to the numerical control section 16 every time it is detected.

Next, at step S3, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If "Vc" has not yet reached "V0", the spindle-axis control section 18 (the decelerating-motion control section 38) judges, at step S4, whether the residual rotation amount Sr is equal to or less than one-half of the total rotation amount S0. If "Sr" is equal to or less than one-half of "S0", the spindle-axis control section 18 (the decelerating-motion control section 38) makes, at step S5, the spindle axis 12 perform the decelerated rotation at maximum capacity using the maximum permissible current of the drive source until the intermediate speed Vb, so as to continuously perform the cutting motion. If "Sr" is not equal to or not less than one-half of "S0", the control flow returns to step S3.

Referring now to FIG. 3, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve (the curve above a time axis). The accelerated rotation at maximum capacity of the spindle axis 12 at step S2 is performed during time periods T1 and T2 shown in FIG. 3, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb, the acceleration of the spindle axis 12 gradually decreases from the maximum acceleration A0 due to the characteristics of the spindle motor 12M. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period T3, the spindle axis 12 performs the decelerated rotation at maximum capacity at step S5.

During the time period T3 (step S5), the spindle-axis control section 18 (the decelerating-motion control section 38) makes the spindle axis 12 to perform the decelerated rotation from the point A (maximum speed) by a velocity control in which the intermediate speed Vb is set as a target value, and the deceleration of the spindle axis 12 is gradually increased due to the characteristics of the spindle motor 12M. During the decelerated rotation at maximum capacity, the spindle-axis control section 18 (the residual rotation-amount detecting section 34 and the current-speed detecting section 36) also sequentially detects the residual rotation amount Sr from the current position and the current speed Vc, of the spindle axis 12. In this way, in the time periods T1, T2 and T3, the spindle-axis control section 18 executes a velocity control for the spindle axis 12 (a step-wise velocity command is illustrated by a broken line).

Turning back to FIG. 2, at step S6, the spindle-axis control section 18 (the flux-content predicting section 42) predicts the actual motor-flux content Φvb at the intermediate speed Vb, based on the motor-flux-content command value Φmax used by the decelerating-motion control section 38 for making the spindle axis 12 reach the intermediate speed Vb through the decelerated rotation from the point A (FIG. 3), by the following equation 2:

$$\Phi vb = \Phi a + (\Phi max - \Phi a) \times (1 - \exp(-T2/\tau)) \quad \text{(equation 2)}$$

Note that "Φa" represents the actual flux content of the spindle motor 12M at the instant when the spindle axis 12 reaches the point A (i.e., at the start of the decelerated rotation by the velocity control), and is estimated by the aforementioned equation 1. The spindle-axis control section 18 (the flux-content predicting section 42) may be configured to estimate as needed the flux content Φ of the spindle motor 12M during operation for rotationally operating the spindle axis 12, in accordance with equation 1, and thereby obtain "Φa". Alternatively, "Φa" may be obtained in advance, e.g., from experiment, and stored as one of control parameters in a memory (not shown) of the controller 10. Also note that "T2" represents an acceleration time corresponding to time period T2 shown in FIG. 3. Although a deceleration time corresponding to time period T3 shown in FIG. 3 is required for predicting the motor-flux content Φvb at the intermediate speed Vb, "T3" is unknown at step S6, so that "T2" is used in equation 2 supposing that T3=T2.

Further, at step S6, the spindle-axis control section 18 (the deceleration determining section 44) determines the appropriate deceleration Adec during the period when the spindle-axis control section 18 (the positioning-motion control section 40) makes the spindle axis 12 perform the decelerated rotation by the position control, based on the motor-flux content Φvb predicted by equation 2, the maximum acceleration A0 detected by the spindle-axis control section 18 (the maximum-acceleration detecting section 32) and the motor-flux-content command value Φmax, by the following equation 3:

$$A\text{dec} = A0 \times \Phi vb / \Phi max \quad \text{(equation 3)}$$

It should be noted that the spindle-axis control section 18 is capable of simultaneously and concurrently processing steps S5 and S6.

Next, at step S7, the spindle-axis control section 18 (the positioning-motion control section 40) monitors the residual rotation amount Sr and the current speed Vc, which are sequentially detected, and determines a position of a time point B (FIG. 3), at which it is expected that "Sr" becomes equal to zero and "Vc" becomes equal to zero (i.e., the spindle axis reaches the target thread depth) if the spindle axis 12 is decelerated from the current speed Vc (hereinafter described as a rotation number per second (unit thereof being represented as rev/sec)) at the deceleration Adec (rev/sec$^2$) determined at step S6. The position of the point B is determined, as the absolute value of the residual rotation amount Sr (negative value) as seen from the point of Sr=0, by the following equation:

$$|Sr| = Vc^2 / (2 \times A\text{dec})$$

based on a formula: Vc$^2$=2×Adec×|Sr|

In this embodiment, it is premised that the spindle axis 12 is decelerated at the constant deceleration Adec from the point B, in order to facilitate a calculation for a position control from the point B until the target thread depth. Accordingly, it is assumed that the current speed Vc of the spindle axis 12 has reached Vb at the point B. As a result, the position |Sr| of the point B can be determined by the following equation 4:

$$|Sr| = Vb^2 / (2 \times A\text{dec}) \quad \text{(equation 4)}$$

It is also assumed, in this embodiment, that a torque necessary for acceleration of the spindle axis 12 (hereinafter referred to as an acceleration torque) is equal to a torque necessary for deceleration of the spindle axis 12 (hereinafter referred to as a deceleration torque). In general, mechanical load (or resistance) arises during the rotation of the spindle axis 12 and thus the acceleration torque becomes larger than the deceleration torque. Therefore, if the acceleration torque is equal to the deceleration torque, a time required for the acceleration at maximum capacity becomes longer than a time required for the deceleration at maximum capacity, provided that the changes of speed thereof correspond to each other. Accordingly, in practice, the spindle axis 12 decelerating from the point A reaches the speed Vb in a time period shorter than the time period T2, and the position |Sr| is represented by:

$$|Sr| > Vc^2/(2 \times Adec)$$

and thereafter, the spindle axis 12 rotates at the intermediate speed Vb for a very short time, so as to reach the point B represented by:

$$|Sr| = Vb^2/(2 \times Adec)$$

(see FIG. 3).

Therefore, the spindle-axis control section 18 (the positioning-motion control section 40) judges whether the absolute value |Sr| of the residual rotation amount Sr of the spindle axis 12 satisfies the equation 4:

$$|Sr| = Vb^2/(2 \times Adec)$$

(i.e., whether or not the rotational position of the spindle axis 12 has reached the point B) (step S7). If the equation 4 is satisfied, the spindle-axis control section 18 (the positioning-motion control section 40) prepares, at step S8, a command for making the spindle axis 12 perform the decelerated rotation at the deceleration Adec and reach the point of Sr=0 (i.e., the target thread depth), and executes a position control for the spindle axis 12 with use of the prepared command. If the equation 4 is not satisfied, the judgment at step S7 is repeated until the equation 4 is satisfied. The spindle axis 12 performs, in accordance with the command from the spindle-axis control section 18 (the positioning-motion control section 40), the cutting motion from the point B toward the target thread depth, by performing the decelerated rotation at the deceleration Adec, and reaches and stops at the target thread depth when "Sr" becomes equal to zero. In this way, in the time period T4 (FIG. 3) in which the spindle axis operates from the point B to reach the target thread depth, the spindle-axis control section 18 executes the position control for the spindle axis 12 (a velocity command at a constant acceleration, obtained from a position command, is shown by a broken line).

If it is judged, at step S3, that the current speed Vc has reached the maximum rotation speed V0, the spindle-axis control section 18 stores, at step S9, a rotation amount (i.e., a rotational position FBS) of the spindle axis 12 from the process start position at an instant when the spindle axis reaches the maximum rotation speed V0, as an acceleration rotation amount Sa. Then, at step S10, the spindle-axis control section 18 judges whether the residual rotation amount Sr is equal to or less than the acceleration rotation amount Sa. If "Sr" is equal to or less than "Sa", the control flow goes to step S5, and subsequently executes steps S6 to S8, so as to perform the cutting motion until the target thread depth. If "Sr" is not equal to or not less than "Sa", the judgment at step S10 is repeated until "Sr" becomes equal to or less than "Sa".

Referring now to FIG. 4, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S3 is No), is depicted by a speed-time curve (the curve above a time axis). As shown in FIG. 4, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb, the acceleration of the spindle axis 12 gradually decreases from the maximum acceleration A0 due to the characteristics of the spindle motor 12M. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at step S10 becomes YES), the motion of the spindle axis 12 changes from the accelerated rotation to the decelerated rotation. Then, in time period T3 (step S5), the spindle axis 12 performs the decelerated rotation at maximum capacity (by the velocity control), and in time period T4 (step S8), the spindle axis 12 performs the decelerated rotation (by the position control) at the appropriate deceleration Adec. The spindle axis 12 reaches and stops at the target thread depth when "Sr" becomes equal to zero. In the time periods T1, T2, T3 and T4, the spindle axis 12 operates in the same manner as the motion shown in FIG. 3.

In the motion examples shown in FIGS. 3 and 4, during a period when the spindle-axis control section 18 controls the rotational (or cutting) motion of the spindle axis 12 from the process start position to the target thread depth, the feed-axis control section 22 (FIG. 1) controls the feed axis 14 so as to perform a feed motion while following the motion of the spindle axis 12, with use of the rotational position FBS of the spindle axis 12. During a period when the spindle-axis control section 18 executes the processes from step S1 to step S10, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

As described above, the controller 10 has a configuration wherein, when the spindle axis 12 is made to perform the cutting motion (rotational motion) from the process start position (starting position) to the target thread depth (target position), the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the sequentially detected residual rotation amount Sr and current speed Vc of the spindle axis 12, the cutting motion until the target thread depth while decelerating the spindle axis 12 at the maximum or appropriate deceleration so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein the spindle-axis control section 18 predicts the actual motor-flux content $\Phi vb$ at the intermediate speed Vb in the step of making the spindle axis 12 reach the intermediate speed Vb through the decelerated rotation from the maximum speed, and determines the deceleration Adec during the period when the spindle axis 12 is made by the position control perform the decelerated rotation from the intermediate speed Vb until the target thread depth, with use of the predicted motor-flux content $\Phi vb$. Therefore, even if the actual motor-flux content $\Phi vb$ of the spindle motor 12M, at the instant when the spindle axis 12 reaches the intermediate speed Vb from the maximum speed, is equal to or less than the motor-flux-content command value $\Phi max$, the spindle axis 12 is able to perform the decelerated rotation at the appropriate deceleration Adec from the intermediate speed Vb, and accurately reach the target thread depth.

In the embodiment shown in FIGS. 1 and 2, the controller 10 is capable of executing, in relation to the aforementioned return motion of the spindle axis 12, a control strategy analogous to the aforementioned control strategy for the cutting motion from the process start position to the target thread depth. FIGS. 3 and 4 show one example of the return motion of the spindle axis 12, corresponding to the aforementioned cutting motion of the spindle axis 12, by a speed-time curve (the curve below a time axis), in addition to the cutting motion. With reference to FIGS. 1 to 4, a method of controlling the return motion of the spindle axis 12, executed by the controller 10, will be described below.

After it is judged that the tapping process has reached the target thread depth, the numerical control section 16 (the spindle-axis command outputting section 26) obtains, at step S1, a total return-rotation amount S0 and a maximum return-rotation speed V0, of the spindle axis 12, during a period when the spindle axis operates from the target thread depth (or starting position) to the return completion position (or target position), from a command value provided in the tapping program P interpreted by the program interpreting section 24, and sends the total return-rotation amount S0 and the maximum return-rotation speed V0 as a spindle-axis command CS to the spindle-axis control section 18. The spindle-axis command CS for the return motion also does not include a position command and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0 is equal to the total rotation amount S0 in the cutting motion, but the maximum return-rotation speed V0 is not always equal to the maximum rotation speed V0 in the cutting motion. Also, if the total return-rotation amount S0 and the maximum return-rotation speed V0 are equal to the total rotation amount S0 and the maximum rotation speed V0 in the cutting motion, the return motion is depicted by the substantially same speed-time curve as that of the cutting motion, but if the total return-rotation amount S0 and the maximum return-rotation speed V0 are different from the total rotation amount S0 and the maximum rotation speed V0 in the cutting motion, the return motion is not always depicted by the same speed-time curve as that of the cutting motion.

Next, at step S2, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source from the target thread depth (i.e., zero speed), by a velocity control in which the maximum return-rotation speed V0 is set as a target value, so as to perform the return motion. The maximum-acceleration detecting section 32 detects a maximum acceleration A0 of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr of the spindle axis 12 from a current position during the accelerated inverse rotation, based on the total return-rotation amount S0 and the rotational position FBS. The spindle-axis control section 18 notifies the detected residual return-rotation amount Sr to the numerical control section 16 every time it is detected.

Next, at step S3, the spindle-axis control section 18 (the current-speed detecting section 36) sequentially detects a current speed Vc of inverse rotation of the spindle axis 12, based on the rotational position FBS during the accelerated inverse rotation at maximum capacity, and judges whether the current speed Vc has not reached the maximum return-rotation speed V0 every time it is detected. If "Vc" has not reached "V0", the spindle-axis control section 18 (the decelerating-motion control section 38) judges, at step S4, whether the residual return-rotation amount Sr is equal to or less than one-half of the total return-rotation amount S0. If "Sr" is equal to or less than one-half of "S0", the spindle-axis control section 18 (the decelerating-motion control section 38) makes, at step S5, the spindle axis 12 perform a decelerated inverse rotation at maximum capacity using the maximum permissible current of the drive source until the intermediate return-speed Vb, so as to continuously perform the return motion. If "Sr" is not equal to or not less than one-half of "S0", the control flow returns to step S3.

Referring now to FIG. 3, one example of the return motion of the spindle axis 12, in the case where the residual return-rotation amount Sr reaches one-half of the total return-rotation amount S0 before the current speed Vc of inverse rotation reaches the maximum return-rotation speed V0 (i.e., in the case where the judgment results at respective steps S3 and S4 are YES), is depicted by a speed-time curve (the curve below a time axis). The accelerated inverse rotation at maximum capacity of the spindle axis 12 at step S2 is performed during time periods T6 and T7 shown in FIG. 3, and the maximum acceleration A0 of inverse rotation is detected during the constant acceleration in the time period T6 (i.e., a time period from a point when the spindle axis starts at the target thread depth to a point when the spindle axis reaches the intermediate return-speed Vb). When the rotational speed of the spindle axis 12 exceeds the intermediate return-speed Vb, the acceleration of the spindle axis 12 gradually decreases from the maximum acceleration A0 due to the characteristics of the spindle motor 12M. At a time point C when the residual return-rotation amount Sr reaches one-half of the total return-rotation amount S0 (i.e., when the rotation amount from the start of returning reaches one-half of the total return-rotation amount S0) (or when the judgment result at step S4 becomes YES), the motion of the spindle axis 12 changes from the accelerated inverse rotation to the decelerated inverse rotation, and in time period T8, the spindle axis 12 performs the decelerated inverse rotation at maximum capacity at step S5.

During the time period T8 (step S5), the spindle-axis control section 18 (the decelerating-motion control section 38) makes the spindle axis 12 to perform the decelerated inverse rotation from the point C (maximum speed) by a velocity control in which the intermediate return-speed speed Vb is set as a target value, and the deceleration of inverse rotation of the spindle axis 12 is gradually increased due to the characteristics of the spindle motor 12M. During the decelerated inverse rotation at maximum capacity, the spindle-axis control section 18 (the residual rotation-amount detecting section 34 and the current-speed detecting section 36) also sequentially detects the residual return-rotation amount Sr from the current position and the current speed Vc of inverse rotation, of the spindle axis 12. In this way, in the time periods T6, T7 and T8, the spindle-axis control section 18 executes a velocity control for the spindle axis 12 (a step-wise velocity command is illustrated by a broken line).

Turning back to FIG. 2, at step S6, the spindle-axis control section 18 (the flux-content predicting section 42) predicts the actual motor-flux content Φvb at the intermediate return-speed Vb, based on the motor-flux-content command value Φmax used by the decelerating-motion control section 38 for making the spindle axis 12 reach the intermediate return-speed Vb through the decelerated inverse rotation from the point C (FIG. 3), by the aforementioned equation 2. Further, at step S6, the spindle-axis control section 18 (the deceleration determining section 44) determines the appropriate deceleration Adec of inverse rotation during the period when the spindle-axis control section 18 (the positioning-motion control section 40) makes the spindle axis 12 perform the decelerated inverse rotation by the position control, based on the motor-flux content Φvb predicted by equation 2, the maximum acceleration A0 of inverse rotation detected by the spindle-axis control section 18 (the maximum-acceleration detecting section 32) and the motor-flux-content command value Φmax, by the aforementioned equation 3.

Next, at step S7, the spindle-axis control section 18 (the positioning-motion control section 40) monitors the residual return-rotation amount Sr and the current speed Vc of inverse rotation, which are sequentially detected, and determines a position of a time point D (FIG. 3), at which it is expected that "Sr" becomes equal to zero and "Vc" becomes equal to zero (i.e., the spindle axis reaches the return completion position) if the spindle axis 12 is decelerated from the current speed Vc of inverse rotation (rev/sec) at the deceleration Adec of inverse rotation (rev/sec$^2$) determined at step S6. The position of the point D is determined, as the absolute value of the residual return-rotation amount Sr (negative value) as seen from the point of Sr=0, by the aforementioned equation 4. Then, the spindle-axis control section 18 (the positioning-motion control section 40) judges whether the absolute value |Sr| of the residual return-rotation amount Sr of the spindle axis 12 satisfies the equation 4: $|Sr|=Vb^2/(2\times Adec)$ (i.e., whether or not the rotational position of the spindle axis 12 has reached the point D). If the equation 4 is satisfied, the spindle-axis control section 18 (the positioning-motion control section 40) prepares, at step S8, a command for making the spindle axis 12 perform the decelerated inverse rotation at the deceleration Adec and stop at the point of Sr=0 (i.e., the return completion position), and executes a position control for the spindle axis 12 with use of the prepared command. If the equation 4 is not satisfied, the judgment at step S7 is repeated until the equation 4 is satisfied. The spindle axis 12 performs, in accordance with the command from the spindle-axis control section 18 (the positioning-motion control section 40), the return motion from the point D toward the return completion position, by performing the decelerated inverse rotation at the deceleration Adec, and reaches and stops at the return completion position when "Sr" becomes equal to zero. In this way, in the time period T9 (FIG. 3) in which the spindle axis operates from the point D to reach the return completion position, the spindle-axis control section 18 executes the position control for the spindle axis 12 (a velocity command at a constant acceleration, obtained from a position command, is shown by a broken line).

If it is judged, at step S3, that the current speed Vc has reached the maximum return-rotation speed V0, the spindle-axis control section 18 stores, at step S9, a rotation amount of the spindle axis 12 from the target thread depth (i.e., a rotational position FBS) at an instant when the spindle axis reaches the maximum return-rotation speed V0, as an acceleration rotation amount Sa of the return motion. Then, at step S10, the spindle-axis control section 18 judges whether the residual return-rotation amount Sr is equal to or less than the acceleration rotation amount Sa. If "Sr" is equal to or less than "Sa", the control flow goes to step S5, and subsequently executes steps S6 to S8, so as to perform the return motion until the return completion position. If "Sr" is not equal to or not less than "Sa", the judgment at step S10 is repeated until "Sr" becomes equal to or less than "Sa".

Referring now to FIG. 4, one example of the return motion of the spindle axis 12, in the case where the current speed Vc of inverse rotation reaches the maximum return-rotation speed V0 before the residual return-rotation amount Sr reaches one-half of the total return-rotation amount S0 (i.e., in the case where the judgment result at step S3 is No), is depicted by a speed-time curve (the curve below a time axis). As shown in FIG. 4, the accelerated inverse rotation of the spindle axis 12 at maximum capacity at step S2 is performed during time periods T6 and T7, and the maximum acceleration A0 of inverse rotation is detected during a constant acceleration in time period T6 (i.e., a time period from a point when the spindle axis starts at the target thread depth to a point when the spindle axis reaches the intermediate return-speed Vb). When the rotational speed of the spindle axis 12 exceeds the intermediate return-speed Vb, the acceleration of the spindle axis 12 gradually decreases from the maximum acceleration A0 due to the characteristics of the spindle motor 12M. The current speed Vc of the spindle axis 12 reaches the maximum return-rotation speed V0 before the residual return-rotation amount Sr reaches one-half of the total return-rotation amount S0, and thereafter, the spindle axis 12 inversely rotates at the constant speed V0 (i.e., null acceleration) over time period T10 so as to continue the return motion. At a time point C when the residual return-rotation amount Sr becomes equal to the acceleration rotation amount Sa (i.e., when the judgment result at step S10 becomes YES), the motion of the spindle axis 12 changes from the accelerated inverse rotation to the decelerated inverse rotation. Then, in time period T8 (step S5), the spindle axis 12 performs the decelerated inverse rotation at maximum capacity (by the velocity control), and in time period T9 (step S8), the spindle axis 12 performs the decelerated inverse rotation (by the position control) at the appropriate deceleration Adec. The spindle axis 12 reaches and stops at the return completion position when "Sr" becomes equal to zero. In the time periods T6, T7, T8 and T9, the spindle axis 12 operates in the same manner as the motion shown in FIG. 3.

In the motion examples shown in FIGS. 3 and 4, during a period when the spindle-axis control section 18 controls the inverse rotational (or return) motion of the spindle axis 12 from the target thread depth to the return completion position, the feed-axis control section 22 (FIG. 1) controls the feed axis 14 so as to perform an inverse feed motion while following the motion of the spindle axis 12, with use of the rotational position FBS of the spindle axis 12. During a period when the spindle-axis control section 18 executes the processes from step S1 to step S10, the numerical control section 16 monitors the residual return-rotation amount Sr notified from the spindle-axis control section 18, and judges that the return motion is completed and the tool has been pulled out from the workpiece when the residual return-rotation amount Sr becomes equal to or less than a second predetermined value (a very small value close to zero).

As described above, the controller 10 has a configuration wherein, when the spindle axis 12 is made to perform the return motion (rotational motion) from the target thread depth (starting position) to the return completion position (target position), the numerical control section 16 instructs only the total return-rotation amount S0 and the maximum return-rotation speed V0, of the spindle axis 12, as the spindle axis command CS to the spindle-axis control section 18, and the spindle-axis control section 18 performs, in accordance with the spindle axis command CS, the return motion by inversely accelerating the spindle axis 12 with the maximum power using the maximum permissible current, aiming at the maximum return-rotation speed V0, and continuously performs, based on the sequentially detected residual return-rotation amount Sr and current speed Vc of the spindle axis 12, the return motion until the return completion position in the shortest time while inversely decelerating the spindle axis 12 at the maximum or appropriate deceleration so as to make the spindle axis reach the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein the spindle-axis control section 18 predicts the actual motor-flux content Φvb at the intermediate return-speed Vb in the step of making the spindle axis 12 reach the intermediate return-speed Vb through the decelerated inverse rotation from the maximum return-speed, and determines the deceleration Adec of inverse rotation during the period when the spindle axis 12 is made by the position control perform the decelerated inverse rotation from the intermediate return-speed Vb until the return completion position, with use of the predicted motor-flux content Φvb. Therefore, even if the actual motor-flux content Φvb of the spindle motor 12M, at the instant when the spindle axis 12 reaches the intermediate return-speed Vb from the maximum return-speed, is equal to or less than the motor-flux-content command value Φmax, the spindle axis 12 is able to perform the decelerated inverse rotation at the appropriate deceleration Adec from the intermediate return-speed Vb, and accurately reach the return completion position.

The above-described configuration of the controller 10 can be described as a machine tool control method for controlling a synchronized operation of the spindle axis 12 and the feed axis 14. The control method includes the steps, executed by the controller 10, of:

obtaining, from a tapping program P, a total rotation amount S0 and a maximum rotation speed V0 of the spindle axis 12 during a period when the spindle axis operates from a starting position to a target position;

making the spindle axis 12 perform an accelerated rotation at maximum capacity from the starting position, by a velocity control in which the maximum rotation speed V0 is set as a target value;

detecting a maximum acceleration A0 of the spindle axis 12 during the accelerated rotation at maximum capacity, based on a rotational position feedback FBS of the spindle axis 12;

detecting a residual rotation amount Sr of the spindle axis 12 during a period when the spindle axis operates from a current position to the target position, based on the total rotation amount S0 and the rotational position feedback FBS;

detecting a current speed Vc of the spindle axis 12 based on the rotational position feedback FBS;

executing a velocity control for making the spindle axis 12 perform a decelerated rotation at maximum capacity so as to reach a predetermined intermediate speed Vb, after the accelerated rotation at maximum capacity;

executing a position control for making the spindle axis 12 perform a decelerated rotation so as to reach the target position, after the spindle axis 12 reaches the intermediate speed Vb;

predicting an actual motor-flux content Φvb at the intermediate speed Vb, based on a motor-flux-content command value Φmax for making the spindle axis 12 reach the intermediate speed Vb; and determining a deceleration Adec during the decelerated rotation by the position control, based on the maximum acceleration A0, the motor-flux-content command value Φmax and the motor-flux content ΦVb;

wherein the step of making the spindle axis 12 reach the target position includes the step of executing the position control, based on the residual rotation amount Sr, the current speed Vc and the deceleration Adec.

According to the above control methods, effects corresponding to those achieved by the above-described controller 10 can be obtained.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising:

a numerical control section configured to prepare a spindle-axis command and a feed-axis command based on a tapping program;

a spindle-axis control section configured to control a rotational motion of the spindle axis in accordance with the spindle-axis command;

a rotation detecting section configured to detect a rotational position of the spindle axis; and
a feed-axis control section configured to control a feed motion of the feed axis in accordance with the feed-axis command, based on the rotational position;
the numerical control section comprising:
a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section;
the spindle-axis control section comprising:
an initial-motion control section configured to make the spindle axis perform an accelerated rotation at maximum capacity from the starting position, by a velocity control in which the maximum rotation speed is set as a target value;
a maximum-acceleration detecting section configured to detect a maximum acceleration of the spindle axis during the accelerated rotation at maximum capacity, based on the rotational position;
a residual rotation-amount detecting section configured to detect a residual rotation amount of the spindle axis during a period when the spindle axis operates from a current position to the target position, based on the total rotation amount and the rotational position;
a current-speed detecting section configured to detect a current speed of the spindle axis based on the rotational position;
a decelerating-motion control section configured to execute a velocity control for making the spindle axis perform a decelerated rotation at maximum capacity so as to reach a predetermined intermediate speed, after the accelerated rotation at maximum capacity;
a positioning-motion control section configured to execute a position control for making the spindle axis perform a decelerated rotation so as to reach the target position, after the spindle axis reaches the intermediate speed;
a flux-content predicting section configured to predict an actual motor-flux content at the intermediate speed, based on a motor-flux-content command value for making the spindle axis reach the intermediate speed; and
a deceleration determining section configured to determine a deceleration during the decelerated rotation by the position control, based on the maximum acceleration, the motor-flux-content command value and the motor-flux content;
the positioning-motion control section configured to execute the position control, based on the residual rotation amount, the current speed and the deceleration.

2. The controller of claim 1, wherein the flux-content predicting section is configured to estimate as needed a flux content of a spindle motor during operation, the spindle motor configured to rotationally operate the spindle axis, and predict the motor-flux content at the intermediate speed, based on the motor-flux-content command value and the flux content estimated at a start of the decelerated rotation by the velocity control.

3. The controller of claim 1, wherein the starting position corresponds to a process start position of a tapping process, and wherein the target position corresponds to a target thread depth of the tapping process.

4. The controller of claim 1, wherein the starting position corresponds to a target thread depth of a tapping process, and wherein the target position corresponds to a return completion position of the tapping process.

5. A method of controlling a machine tool, configured to control a synchronized operation of a spindle axis and a feed axis, the method comprising the steps, executed by a controller, of:
obtaining, from a tapping program, a total rotation amount and a maximum rotation speed of the spindle axis during a period when the spindle axis operates from a starting position to a target position;
making the spindle axis perform an accelerated rotation at maximum capacity from the starting position, by a velocity control in which the maximum rotation speed is set as a target value;
detecting a maximum acceleration of the spindle axis during the accelerated rotation at maximum capacity, based on a rotational position feedback of the spindle axis;
detecting a residual rotation amount of the spindle axis during a period when the spindle axis operates from a current position to the target position, based on the total rotation amount and the rotational position feedback;
detecting a current speed of the spindle axis based on the rotational position feedback;
executing a velocity control for making the spindle axis perform a decelerated rotation at maximum capacity so as to reach a predetermined intermediate speed, after the accelerated rotation at maximum capacity;
executing a position control for making the spindle axis perform a decelerated rotation so as to reach the target position, after the spindle axis reaches the intermediate speed;
predicting an actual motor-flux content at the intermediate speed, based on a motor-flux-content command value for making the spindle axis reach the intermediate speed; and
determining a deceleration during the decelerated rotation by the position control, based on the maximum acceleration, the motor-flux-content command value and the motor-flux content;
the step of making the spindle axis reach the target position including the step of executing the position control, based on the residual rotation amount, the current speed and the deceleration.

6. The method of claim 5, wherein the step of predicting the motor flux-content includes the step of estimating as needed a flux content of a spindle motor during operation, the spindle motor configured to rotationally operate the spindle axis, and predicting the motor-flux content at the intermediate speed, based on the motor-flux-content command value and the flux content estimated at a start of the decelerated rotation by the velocity control.

7. The method of claim 5, wherein the starting position corresponds to a process start position of a tapping process, and wherein the target position corresponds to a target thread depth of the tapping process.

8. The method of claim 5, wherein the starting position corresponds to a target thread depth of a tapping process, and wherein the target position corresponds to a return completion position of the tapping process.

* * * * *